United States Patent
Crandall et al.

(12)

(10) Patent No.: US 6,352,766 B1
(45) Date of Patent: Mar. 5, 2002

(54) SELF-ASSOCIATING LOW ADHESION BACKSIZE MATERIAL

(75) Inventors: Michael D. Crandall, North Oaks; Steven S. Kantner, St. Paul, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/288,911

(22) Filed: Apr. 9, 1999

(51) Int. Cl.$^7$ .................................................. B32B 7/12
(52) U.S. Cl. ....................... 428/343; 428/343; 428/349; 428/355 R
(58) Field of Search ............................... 428/352, 343, 428/349, 355 R

(56) References Cited

U.S. PATENT DOCUMENTS

| | | |
|---|---|---|
| 3,933,702 A | 1/1976 | Caimi et al. |
| 4,282,054 A | 8/1981 | Mattor et al. |
| 4,440,830 A | 4/1984 | Wempe |
| 5,229,179 A | 7/1993 | Kumar et al. |
| 5,284,690 A | 2/1994 | Williams et al. |
| 5,413,815 A | 5/1995 | Williams et al. |
| 5,478,880 A | 12/1995 | Shipston et al. |
| 5,516,865 A | 5/1996 | Urquiola |
| 5,548,017 A | 8/1996 | DiStefano |
| 5,621,030 A | 4/1997 | Shipston et al. |
| 5,674,592 A | 10/1997 | Clark et al. |

FOREIGN PATENT DOCUMENTS

EP         0 448 399 A2    9/1991

OTHER PUBLICATIONS

Handbook of PSA Technology, $2^{nd}$ Ed., D. Satas, ed., ch. 23 "Release Coatings," Van Nostrand Reinhold, 1989.
Patent Abstract of Japan Publication No. 10330683, Dec. 15, 1998.

*Primary Examiner*—Duc Truong
(74) *Attorney, Agent, or Firm*—Carolyn V. Peters

(57) ABSTRACT

A low adhesion backsize (LAB) material made by mixing together materials, which self-associate. The mixtures can be waterbased and have high solids levels. The release is provided by functional groups such as silicones, fluorocarbons or long chain hydrocarbons. Release level can be tailored with release levels as low as the 0.5 gram/cm range to microsphere adhesives.

19 Claims, No Drawings

SELF-ASSOCIATING LOW ADHESION BACKSIZE MATERIAL

FIELD OF THE INVENTION

This invention relates to a low adhesion backsize and release coatings of the type employed in connection with normally tacky and pressure-sensitive adhesive coated articles and more particularly to self-associating low adhesive backsize coatings.

BACKGROUND OF INVENTION

Normally tacky and pressure-sensitive adhesive (PSA) materials have been used for well over half a century. Products of this type, which take the form of tapes, labels, and other types of adhesive coated articles, must be protected from unintended adhesion to other surfaces. Hence, tapes are typically wound into a roll on their own backing and labels and sheets are typically laminated to a release sheet or one on top of another to prevent their accidental adhesion to other surfaces and also to prevent their contamination with air-borne dust and other contaminants. In order to allow the roll to be unwound without the undesirable transfer of adhesive to the tape backing, or to permit an adhesive-coated sheet to be removed from a stack of similarly coated sheets, it is customary to provide the tape backing or the surface of a successive sheet with a low adhesion backsize (LAB). Similarly, the release sheet or liner to which the adhesive coated article is typically laminated is supplied with a release coating to permit the easy removal of the liner from the coated article.

This LAB or release coating is expected to reproducibly provide an appropriate level of release from the adhesive of interest, to not deleteriously affect the adhesive, and to be resistant to aging so that the release level remains relatively stable with time. In recent years, as competition has expanded in the PSA industry, a need to differentiate product performance as well as more demanding product requirements has led to recognition of the importance of release level. D. Satas, Chapt. 23 "Release Coatings", Handbook of Pressure Sensitive Adhesive Technology, Second Edition, D. Satas, ed., Van Nostrand Reinhold, 1989, defines seven distinct levels of release, ranging from "super low release" (0.15–0.30 N/dm) to "very tight release" (20–80 N/dm). In many circumstances it is important for the LAB to possess other properties besides functioning as a release agent. For example, the release coating on masking tape must possess good solvent resistance in addition to providing a surface to which paint can adhere.

Release coatings and LABs are typically applied to substrates at coating weights around 1 g/m$^2$. In order to obtain such thin coatings, dilute solutions (2 to 5% solids) of the coating compositions in organic solvents have traditionally been used. Recent efforts have been directed to delivering such coatings at high or 100% solids or from aqueous media, thus reducing the environmentally damaging hydrocarbon emissions, conserving precious natural resources, and lowering economic cost. Despite the numerous efforts to produce release coatings at high or 100% solids or from aqueous media, such coatings have still required a complex combination of components and involved polymerization processes in order to insure adequate release levels, as well as minimizing release coating transfer.

For example, a release coating is described comprising a hydrocolloid stabilized aqueous emulsion of a crosslinkable film forming vinyl polymer having a glass transition temperature of from 0° to 60° C. and from 0.5 to 20% by weight on emulsion polymer solids of a release promoting compound including silicone copolyols, hydrocarbon or fluorocarbon Werner complexes, or organofunctional siloxanes. Unfortunately, this coating requires cross-linking.

Another example discloses a substrate coated with a release coating composition consisting essentially of polyvinyl alcohol, a migratable release-promoting agent, a water-soluble salt of a coordinating metal, and a water soluble boron compound. The release-promoting agent is functionally defined as a surfactant that gives a release value less than about 162.5 grams per centimeter for masking tape when formulated at 5% loading into polyvinyl alcohol. Not only does this example require cross-linking, but uses salts of a coordinating metal, which can be toxic.

One conventional method improves the releasability of a backing layer by applying a mixture comprising a polymer, preferably having acid functionality, and an aqueous solution or dispersion of an organic compound having at least one fatty acid ester and at least one quaternary amine, such as lecithin. However, the use of an ionic interaction to develop anchorage to a substrate lends itself to moisture sensitivity.

Yet another aqueous release coating for pressure sensitive adhesive tapes attempts to provide a release coating comprising a latex film forming polymeric material, a release promoting additive, and a microdispersed polyamide resin having a softening point greater than 70° C. As described, preferred release promoting additives include N-alkyl sulfosuccinamates, alkyl sulfosuccinates, alkylaryl polyalkylene oxides, salts of long chain alkyl sulfates, and amine polyglycol condensates. It has been observed that initially there is transfer of the release coating to the adhesive and such observation is supported by heat aging data that reveals loss of tack (using a rolling ball test).

Another example of an aqueous based release coating composition suitable for a repositionable adhesive that comprises about 10 to about 80 parts by wet weight of a sulfosuccinamate surfactant and about 20 to about 90 parts by wet weight of an acrylic copolymer. These compositions appear to rely solely on ionic interactions, which tend to be sensitive to humidity.

Therefore, what is needed is an aqueous release coating composition that can be prepared by blending commercially available materials, hence does not require a polymerization process; that can provide a wide range of release levels for both permanent and repositionable pressure sensitive adhesives with the level of release determined by the amount and nature of the components; that does not require post-coating crosslinking reactions to provide stable release performance and minimal loss in readhesion values; and that is not sensitive to humid environments. A further need is a release coating prepared from water based materials that does not require organic cosolvents to provide acceptable release performance on coating and drying. A still further need is a release coating delivered from water with the above attributes that is capable of being written on with water based pens and which securely anchors paint and ink.

SUMMARY OF THE INVENTION

Briefly, in one aspect of the present invention, a low adhesion backsize coating is provided comprising:

(1) 25% to 75% by weight on a solids basis of a functional polymer wherein the functional polymer has
   (a) a functional moiety,
   (b) is non-tacky at room temperature, (c) is water dispersible or water-based or a latex emulsion,
(d) optionally, may be a copolymer,
(e) optionally, may be crosslinked and (2) 75% to 25% by weight on a solids basis of a release-promoting additive having a molecular weight of 10,000 or less, wherein the release-promoting additive is
　(a) a bifunctional material, wherein such bifunctional material has
　　(i) a release moiety at one end, and
　　(ii) an anchoring moiety at the other end has a complementary function to the functional moiety of the functional polymer, and
　(b) is water dispersible or water miscible.

The functional polymer in combination with the release-promoting additive advantageously minimizes surface energy and cohesive failure. The functionality of the functional polymer is selected in such way as to promote ionic interactions, acid-base interactions, and/or hydrogen bonding. It is preferable that the combination of the functional polymer and the release promoting additive work in such a fashion as to provide more than one interaction per molecule of each component, for example multiple hydrogen bonds or acid-base interactions. Although some covalent bonding may be tolerated between the functional polymer and the release promoting additive, it is preferred that there be no covalent bonding, but rather the weaker interactions such as described above.

DESCRIPTION OF THE PREFERRED EMBODIMENT(S)

This invention describes a low adhesion backsize (LAB) material made by mixing together materials, which will self-associate. The mixtures can be waterbased and have high solids levels. The release is provided by functional groups such as silicones, fluorocarbons or long chain hydrocarbons. Release level can be tailored with release levels as low as the 0.5 gram/cm range to microsphere adhesives.

By using commercially available materials and not having to conduct a polymerization process the cost of the LAB is the cost of the components. The samples made thus far have exhibited not only low release levels but also high writeability and high lithographic print density. The current invention couples low to moderate molecular weight surface active materials (silicones, fluorocarbons, long chain hydrocarbons) which also possess a moiety available for interaction with a film forming polymer via ionic, acid-base, or hydrogen bonding providing good anchorage. During the drying process, it is believed that the low molecular weight of the surface-active material allows it to migrate readily to the interface prior to anchoring.

Alternately the two components can be coated in layers instead of mixing together and coating. For example the functional base polymer can be coated and dried on the substrate, followed by coating and drying of the release promoting additive. Advantageously, one of the coatings can be applied to the substrate and subsequently, the second layer could be applied. For example, the functional polymer layer could be applied at the time a substrate is manufactured. When used, this substrate could then be coated with the release promoting additive material, thus providing the combination of the present invention. This would be advantageous, for example, when the functional base polymer is included in a coating that is needed on the substrate, such as a matte coating on a film substrate.

Functional Base Polymer

Useful functional base polymers are those that are water dispersible, water-based, or a latex emulsion material. General physical properties include glass transition temperatures above room temperature and film formation upon drying. In addition, the polymer may be a copolymer and may be crosslinked. From a chemical nature, the polymer unit includes functional moieties that complement the functional groups on the release component. Such functionalities include hydrogen bond donors, such as carboxylic acids or alcohols; hydrogen bond acceptors, such as substituted amides or ethers; acidic groups; basic groups; anionic groups; cationic groups or combinations thereof. Particularly useful types of such polymers containing these functionalities include but are not limited to (meth)acrylates, vinyl acetates, styrenes, polyurethanes, cellulosics, and the like. Preferred polymers are the (meth)acrylates. Most preferred are carboxylic (meth)acrylates, which are commercially available. Specific examples include Rohm & Haas Acusol or Acrysol series of carboxylic latices and B. F. Goodrich Carboset series.

Release Promoting Additive

The release promoting additive materials useful in this invention are bifunctional. By "bifunctional" it is meant that the release promoting additive material has at least two portions wherein one portion has a release moiety and the other portion an anchoring moiety. Useful materials have a molecular weight generally less than 10,000, preferably less than 5,000 since it is believed that lower molecular weight allows for mobility of the material to the air interface during drying. Also, the additive should be water dispersible or water miscible. Further, the release moiety can be a long chain hydrocarbon, a fluorochemical, or a silicone. Preferably, the poly(dimethyl siloxane) group is used as it provides low release with minimal loading.

The anchoring moieties include hydrogen bond donors, such as carboxylic acids or alcohols; hydrogen bond acceptors, such as substituted amides, or ethers; acidic groups; basic groups; anionic groups; or cationic groups. This anchoring group is chosen to provide a complementary functionality to that of the functional base polymer.

Examples of such release promoting additive materials having bifunctionality include nonionic surfactants, long chain alkyl carboxylic acids and their salts; silicone copolyols and fluorochemical surfactants. Examples of commercially available water dispersible or water soluble materials include, but are not limited to: Brij and Tween surfactants available from ICI Chemicals; Silwet silicone surfactants from Witco Corp.; the silicone surfactant series from Dow Corning; and the Zonyl series of fluorochemical surfactants from Du Pont.

Combinations of Functional Base Polymer and Release Promoting Additive

The combination of the functional base polymer and a release promoting additive are chosen such that the anchoring moiety of the release promoting additive and the functional moiety of the functional base polymer are complementary. This is to provide interactions such as hydrogen bonding, acid-base interaction, or ionic interaction. It is preferable that the combination of the functional polymer and the release promoting additive work in such a fashion as to provide more than one interaction per molecule. For example, a polyether chain with a polyacrylic acid chain form multiple hydrogen bonds between the two chains.

By choosing the components properly, the resulting release surface will have minimum surface energy, and good cohesive strength. To maintain this balance, the functional polymer is generally in the range from 25 to 75% by weight of the composition and a release promoting additive is 75 to 25% by weight of the composition.

The low adhesion backsize coating of the present invention can be a combination of more than one functional polymer with a single release promoting additive, a single functional polymer with more than one release promoting additive and more than one functional polymer with more than one release promoting additive. Furthermore, each functional polymer and each release promoting additive may have more than one functional moiety.

Adhesives

Release coatings of this invention can generally be used with a variety of pressure sensitive adhesives. Types of adhesives include but are not limited to acrylics, tackified rubber resins, and tackified block copolymers ranging in adhesive strength from permanent to removable.

Substrates

The release coatings defined above are best used as a coating for a solid substrate, which may be a sheet, fiber or shaped object. However, the preferred substrates are fixed flexible substrates such as are used for pressure sensitive adhesive products. Suitable substrates include paper, coated paper such as polymeric coated or saturated paper (for example polyethylene coated kraft paper), metal sheets and foils, non-woven fabrics, and films of thermoplastic resins such as polyesters, polyamides, polyolefins, polycarbonate, polyvinyl chloride, etc., although any surface requiring release toward adhesives can be used. Primers known in the art can be utilized to aid in adhesion of the coating to the substrate, but they are not generally necessary.

Coating Methods

Release coating compositions of the present invention may be applied to suitable substrates by means of conventional coating techniques such as wire-wound rod, direct gravure, offset gravure, reverse roll, air-knife, and trailing blade coating; hot melt coating is also possible.

The release coatings and the LABs of the coated sheet material are typically applied at about 0.2 to about 2.0 grams/m$^2$ depending upon the nature of the flexible substrate and the intended application of the coated sheet material.

Articles

Articles that may be prepared using the release coating compositions of the present invention include but are not limited to a roll of tape, a tape with a release liner and a transfer tape. A roll of tape comprises a flexible backing member, a pressure sensitive adhesive coating on one major surface of the backing member and a release coating on the opposite major surface of the backing comprising the low adhesion backsize defined above. Furthermore, the tape with a release liner comprises a flexible backing member, a pressure-sensitive adhesive coating on one major surface of the backing member and a release liner comprising a flexible sheet coated over the major surface adhered to the pressure-sensitive coating with the low adhesion backsize defined above. The transfer tape comprises a film of pressure-sensitive adhesive between two release liners, at least one being coated with the low adhesion backsize of this invention.

Additional articles include but are not limited to a single coated sheet material, a stack of coated sheets, a fan-folded web of coated sheet material and a roll of coated sheet material. Such coated sheet materials generally comprise a coating of the release coating composition of the present invention on at least a portion of one side of the sheet and an adhesive is on at least a portion of the other side. Typically, the adhesive is a normally tacky and pressure-sensitive adhesive. The stack of superimposed sheets of the coated sheet material comprises a series of pressure-sensitive adhesive coated sheets being in contact with a release coating composition portion of an immediately adjacent sheet.

Alternatively, the stack of superimposed sheets can be configured to be a fan folded web formed from the coated sheet material, wherein an adhesive coating is on each segment of the web being in contact with a low adhesion backsize on an immediately adjacent segment.

Additional articles include, but are not limited to:

(a) a coated sheet material having a low adhesion backsize on one side and adhesive on the other side wherein said coated sheet material could be wound convolutedly on itself about a core to form a roll;

(b) a coated sheet material wherein the low adhesion backsize covers the first portion of one side and any normally tacky pressure-sensitive adhesive covers a second portion of the same side;

(c) a coated sheet material wherein the sheet is an elongated strip having spaced alternately areas of low adhesion backsize and adhesive; and (d) a coated sheet material wherein the sheet is generally rectangular, the low adhesion backsize being present in a band adjacent one edge and pressure-sensitive adhesive being present in a band adjacent the opposite edge.

Alternately the two components can be coated in layers instead of mix and coating. For example the functional base polymer can be coated and dried on the substrate, followed by coating and drying of the release promoting additive. This would be advantageous, for example, when the functional base polymer is included in a coating that is needed on the substrate, such as a matte coating on a film substrate.

This invention is further illustrated by the following examples that are not intended to limit the scope of the invention. In the examples, all parts, ratios and percentages are by weight unless otherwise indicated. The following test methods were used to evaluate and characterize the self-associating low adhesion backsize produced in the examples.

EXAMPLES

Test Methods

Release Test

The release test was used to measure the amount of force required to remove an adhesive coated sheet from the release coated substrate at a specific peel angle and peel rate.

A sample (21.8 cm×28.2 cm) of the test specimen was applied (release coated side up) to the test plate of a tensile tester (Instron® Model #1122, available from Instron Corp., Canton, Mass.) using double coated adhesive tape. A 2.54 cm wide strip of an adhesive coated sheet was applied to the release coated surface of the test specimen leaving a free end. A 2 kilogram hard rubber roller was used to firmly apply the adhesive coated sheet to the test specimen by rolling over the sample twice by hand. The free end of the adhesive coated sheet was attached to the load cell of the tensile tester such that the peel angle was maintained at 90 degrees. The test plate was then clamped into the jaws of the tensile tester and the peel force (in grams) was recorded at a constant peel rate of 30.8 cm per minute. The release values reported in the Tables are an average of three tests. After release testing the adhesive coated sheets were set aside for use in the readhesion test described below. The adhesive coated sheets used for testing were Scotch™ Magic™ Tape 810 and Post-it® Notes available from 3M Company, St. Paul, Minn., unless otherwise noted.

Readhesion Test

The readhesion test was used to measure the force required to remove a 1 mil (0.025 mm) thick, smooth polyester film from the adhesive surface of the adhesive coated sheet that was removed from the release coated test specimen in the release test procedure described above. The test gives an indication as to whether any of the release coating was transferred to the adhesive, which can affect the tack and adhesion properties of the adhesive.

The adhesive coated sheet was applied (adhesive coated side up) to the test plate of a tensile tester (Instron® Model #1122, available from Instron Corp., Canton, Mass.) using double coated adhesive tape. A 3.18 centimeter wide strip of polyester film was applied to the adhesive surface of the adhesive coated sheet leaving a free end. A 2 kilogram hard rubber roller was used to firmly apply the polyester film strip to the adhesive coated sheet by rolling over the sample twice by hand. The free end of the polyester film strip was attached to the load cell of the tensile tester such that the peel angle was maintained at 90 degrees. The test plate was then clamped into the jaws of the tensile tester and the peel force (in grams) was recorded at a constant peel rate of 30.8 cm per minute. The readhesion values reported in the Tables were an average of three tests. For reference, Post-it™ Note adhesion is typically 24–28 g/cm, Scotch™ Magic™ Tape is typically 157–197 g/cm.

Materials

Acrysol ASE-60 is a 29% solids carboxylated latex available from Rohm and Haas Co., Philadelphia, Pa.

Dow Corning 193 is a 100% solids silicone ethylene oxide copolymer available from Dow Corning, Midland Mich.

Brij 76 is a 100% solids polyoxyethylene stearyl ether available from ICI Surfactants, Wilmington, Del.

Tween 61 is a 100% solids polyoxyethylene sorbitan monostearate ether available from ICI Surfactants, Wilmington, Del.

Unithox D-100 is a 25% solids dispersion of polyoxyethylene n-$C_{40}$ ether available form Petrolite Corp., Tulsa, Okla.

Acusol 810A is an 18% solids carboxylated latex available from Rohm and Haas Co., Philadelphia, Pa.

Acusol 820 is a 30% solids carboxylated latex available from Rohm and Haas Co., Philadelphia, Pa.

Acusol 842 is an 18% solids carboxylated latex available from Rohm and Haas Co., Philadelphia, Pa.

T-Det N-10.5 is a 100% solids ethoxylated nonylphenol, available from Harcos Chemicals, Kansas City, Kans.

Rhodacal DS-10 is a 100% solids sodium dodecyl benzene sulfonate, available from Rhone-Poulenc, Cranbury, N.J.

Poly(1-vinyl pyrrolidone-co-styrene) is available from Aldrich Chemical, Milwaukee, Wis.

Poly(diallyldimethyl ammonium chloride) is available from Aldrich Chemical, Milwaukee, Wis.

FC-120 is a fluorochemical surfactant available from 3M Company, St. Paul, Minn.

Example 1

5.0 grams of Dow Corning 193 was premixed with 8.0 grams of deionized water by stirring with a spatula in a beaker until a clear solution was obtained. The solution was then added to 10.0 grams of Acrysol ASE-60 in a beaker while stirring with a magnetic stirrer. The mixture was stirred for one minute. The resultant mixture was then coated onto the wire side of raw 20 pound bond paper using a #18 Meyer rod. The coated paper was then dried in an oven at 65° C. for twenty minutes.

Example 2

Example 2 was prepared according to the procedure of Example 1 except that the mixture was coated onto a 1.6 mil (0.041 mm) thick biaxially oriented polypropylene film (available from AMTOPP Corp., Livingston, N.J.) using a #12 Meyer rod.

Example 3

3.0 grams of Dow Corning 193 was premixed with 4.8 grams of deionized water by stirring with a spatula in a beaker until a clear solution was obtained. The solution was then added to 10.0 grams of Acrysol ASE-60 in a beaker while stirring with a magnetic stirrer. The mixture was stirred for one minute. The mixture was then coated onto a 1.6 mil (0.041 mm) thick biaxially oriented polypropylene film (available from AMTOPP Corp., Livingston, N.J.) using a #12 Meyer rod. The coated film was then dried in an oven at 65° C. for twenty minutes.

Example 4

1.0 grams of stearic acid and 5.0 grams of ammonium hydroxide (5% solution) were premixed with 5.0 grams of deionized water by stirring with a spatula in a beaker for one minute. The solution was then added to 1.5 grams of poly(1-vinyl pyrrolidone-co-styrene) in a beaker while stirring with a magnetic stirrer. The mixture was stirred for one minute. The mixture was then coated onto the matte side of a 1.8 mil (0.046 mm) thick biaxially oriented polypropylene film (available from Luxus Pack Packaging Quan Yin Hsiang, Taouan Hsien, Taiwan) using a #6 Meyer rod. The coated film was then dried in an oven at 65° C. for fifteen minutes.

Example 5

0.50 grams of FC-120 fluorocarbon surfactant was added to 5.64 grams of poly(diallyldimethyl ammonium chloride) in a beaker while stirring with a magnetic stirrer. The mixture was stirred for one minute. The mixture was then coated onto the matte side of a 1.8 mil (0.046 mm) thick biaxially oriented polypropylene film (available from Luxus Pack Packaging Quan Yin Hsiang, Taouan Hsien, Taiwan) using a #6 Meyer rod. The coated film was then dried in an oven at 65° C. for fifteen minutes.

Example 6

Acrysol ASE-60 was coated onto the matte side of a 1.8 mil (0.046 mm) thick biaxially oriented polypropylene film (available from Luxus Pack Packaging Quan Yin Hsiang, Taouan Hsien, Taiwan) using a #6 Meyer rod. The coated film was then dried in an oven at 65° C. for fifteen minutes.

2.50 grams of octadecylamine and 22.50 grams of isopropanol were premixed by stirring with a spatula in a beaker. The mixture was stirred and slightly heated until a clear solution formed. The mixture was then coated onto the Acrysol ASE-60 coated side of the above biaxially oriented polypropylene film using a #6 Meyer rod. The coated film was then dried in an oven at 65° C. for fifteen minutes.

Example 7

Acrysol ASE-60 was coated onto the matte side of a 1.8 mil (0.046 mm) thick biaxially oriented polypropylene film (available from Luxus Pack Packaging Quan Yin Hsiang, Taouan Hsien, Taiwan) using a #6 Meyer rod. The coated film was then dried in an oven at 65° C. for fifteen minutes.

0.50 grams of Dow Corning 193 and 9.50 grams of deionized water were premixed by stirring with a spatula in a beaker until a clear solution was obtained. The solution was then coated onto the Acrysol ASE-60 coated side of the above biaxially oriented polypropylene film using a #6 Meyer rod. The coated film was then dried in an oven at 65° C. for fifteen minutes.

Comparative Example C8

Latex Polymer Preparation:

4.80 grams of T-Det N-10.5 and 4.80 grams of Rhodacal DS-10 were dissolved in 488.9 grams of deionized water in a two liter, split resin flask equipped with a nitrogen purge, paddle blade stirrer, thermocouple, and a water jacketed condenser. The stirrer was set to 300 rpm and a nitrogen purge was started. The mixture was stirred until all the emulsifiers were dissolved. While stirring the solution, 400 grams of ethyl acrylate was then added using a funnel. The initiator was then added (0.30 grams of potassium persulfate and 0.08 grams of sodium metabisulfate). The reaction mixture was stirred and heated to 32° C. using infrared lamps in conjunction with a temperature controller. After heating at 32° C. for 56 minutes, the temperature was raised to 37° C. and maintained at 37° C. for 5 minutes. The temperature was then raised to 42° C. and maintained at 42° C. for 6 minutes. Additional initiator was then added (0.15 grams of potassium persulfate and 0.15 grams of sodium metabisulfite). Approximately two minutes after the additional initiator was added an exotherm was observed and the temperature of the reaction mixture rose to 89° C. The temperature was allowed to cool to 65° C. and was held at 65° C. for 1 hour. The product solution was allowed to cool to room temperature and was then filtered through two layers of cheesecloth.

The latex was coated onto the matte side of a 1.8 mil (0.046 mm) thick biaxially oriented polypropylene film (available from Luxus Pack Packaging Quan Yin Hsiang, Taouan Hsien, Taiwan) using a #6 Meyer rod. The coated film was then dried in an oven at 65° C. for fifteen minutes.

0.50 grams of Dow Corning 193 and 9.50 grams of deionized water were premixed by stirring with a spatula in a beaker until a clear solution was obtained.

The solution was then coated onto the latex coated side of the above biaxially oriented polypropylene film using a #6 Meyer rod. The coated film was then dried in an oven at 65° C. for fifteen minutes.

Comparative Example C9

3.40 grams of Dow Corning 193 was premixed with 8.00 grams of deionized water by stirring with a spatula in a beaker until a clear solution was obtained. The solution was then added to 4.40 grams of the latex polymer solution (prepared in Comparative Example C8 above) in a beaker while stirring with a magnetic stirrer. The mixture was stirred for one minute. The solution was then coated onto the matte side of a 1.8 mil (0.046 mm) thick biaxially oriented polypropylene film (available from Luxus Pack Packaging Quan Yin Hsiang, Taouan Hsien, Taiwan) using a #6 Meyer rod. The coated film was then dried in an oven at 65° C. for fifteen minutes.

Examples 1–3 were tested for release as described above. Results are given in Table 1. Examples 4–7, C8, and C9 were tested for release and readhesion as described above. Results are given in Table 2.

TABLE 1

| Example | Release with Scotch ™ Magic ™ Tape 810 (g/cm) | Release with Post-it ® Notes (g/cm) |
| --- | --- | --- |
| 1 | 5.1 | Not measured |
| 2 | 115 | 20.4 |
| 3 | 39.5 | 2.6 |

TABLE 2

| Example | Release with Scotch ™ Magic ™ Tape 810 (g/cm) | Readhesion with Scotch ™ Magic ™ Tape 810 (g/cm) | Release with Post-it ® Notes (g/cm) | Readhesion with Post-it ® Notes (g/cm) |
| --- | --- | --- | --- | --- |
| 4 | 66 | 154 | 13.7 | 21 |
| 5 | 128 | 75 | 6.7 | 19 |
| 6 | 16.5 | 155 | 1.5 | 21 |
| 7 | 17.6 | 150 | 1.8 | 20 |
| C8 | 2.0 | 13.9 | ** | ** |
| C9 | 1.0 | 9.4 | ** | ** |

**Post-it ® Note did not adhere to surface, and surface tack was lost.

Example 10

0.9 grams of Brij 76 was premixed with 3.6 grams of deionized water by stirring with a spatula in a beaker until a clear solution was obtained. The solution was then added to 5.0 grams of Acusol 810 A in a beaker while stirring with a magnetic stirrer. The mixture was stirred for twenty minutes. The resultant mixture was then coated onto a 1.6 mil (0.041 mm) thick polyester film (from 3M Specialty Film Division, St Paul, Minn.) using a #12 Meyer rod. The coated film was then dried in a 65° C. oven for five minutes.

Qualitatively, easy release was seen for Scotch™ Magic™ Tape 810 and Scotch™ Masking Tape No. 232 (both available from 3M Company, St. Paul, Minn.) when laminated to this coating and then peeled off by hand.

Example 11

3.6 grams of Unithox D-100 were added to 5.0 grams of Acusol 810A in a beaker while stirring with a magnetic stirrer. The mixture was stirred for twenty minutes. The mixture was then coated onto a 1.6 mil (0.041 mm) thick polyester film (from 3M Specialty Film Division, St Paul, Minn.) using a #12 Meyer rod. The coated film was then dried in a 65° C. oven for five minutes.

Example 12

1.5 grams of Tween 61was premixed with 6.0 grams of deionized water by stirring with a spatula in a beaker until a clear solution was obtained. The solution was then added to 5.0 grams of Acusol 820 in a beaker while stirring with a magnetic stirrer. The mixture was stirred for twenty minutes. The resultant mixture was then coated onto a 1.6 mil (0.041 mm) thick polyester film (from 3M Specialty Film Division, St Paul, Minn.) using a #12 Meyer rod. The coated film was then dried in a 65° C. oven for five minutes.

Qualitatively, easy release was seen for Scotch™ Magic™ Tape 810 and Scotch™ Masking Tape No. 232 (both available from 3M Company, St. Paul, Minn.) laminated to this coating and then peeled off by hand.

Example 13

0.9 grams of Tween 61was premixed with 3.6 grams of deionized water by stirring with a spatula in a beaker until a clear solution was obtained. The solution was then added to 5.0 grams of Acusol 842 in a beaker while stirring with a magnetic stirrer. The mixture was stirred for twenty minutes. The resultant mixture was then coated onto a 1.6 mil (0.041 mm) thick polyester film (from 3M Specialty Film Division, St Paul, Minn.) using a #12 Meyer rod. The coated film was then dried in a 65° C. oven for five minutes.

Qualitatively, easy release was seen for Scotch™ Magic™ Tape 810 and Scotch™ Masking Tape No. 232 (both available from 3M Company, St. Paul, Minn.) when laminated to this coating and then peeled off by hand.

Example 14

43.5 grams of Dow Corning 193 was premixed with 70.0 grams of deionized water by stirring with a spatula in a beaker until a clear solution was obtained. The solution was then added to 87.0 grams of Acrysol ASE-60 in a beaker while stirring with a magnetic stirrer. The mixture was stirred for two minutes. The mixture was then coated using a die coater onto the wire side of 20 pound bond paper. The coating was dried using radiant heat to a moisture content of approximately 3.5%. The dry coating weight of the release coating was 0.26 grams/ft$^2$.

The release coated material was tested for release and readhesion as described above using a Post-it® Note as the adhesive coated sheet for testing. In preparing the samples for release testing, the Post-it® Note was laminated to the release coated surface using a pressure of 4.5×10$^5$ N/m$^2$ for 30 seconds instead of using a 2 kilogram hard rubber roller. Initial data and data recorded after aging are given in Table 3.

TABLE 3

| Initial Release (g/cm) | Release after 2 weeks at 70° F./ 80% RH (g/cm) | Release after 2 weeks at 120° F. (g/cm) | Initial Read-hesion (g/cm) | Readhesion after 2 weeks at 70° F./80% RH (g/cm) | Readhesion after 2 weeks at 120° F. (g/cm) |
| --- | --- | --- | --- | --- | --- |
| 5.9 | 7.0 | 6.6 | 21.2 | 19.0 | 20.6 |

Various modifications and alterations of this invention will become apparent to those skilled in the art without departing from the scope and principles of this invention, and it should be understood that this invention is not to be unduly limited to the illustrative embodiments set forth hereinabove. All publications and patents are incorporated herein by reference to the same extent as if each individual publication or patent was specifically and individually indicated to be incorporated by reference.

What is claimed:

1. A low adhesion backsize coating is provided comprising:
   (1) 25% to 75% by weight on a solids basis of a functional polymer wherein the functional polymer has
      (a) a functional moiety,
      (b) is non-tacky at room temperature,
      (c) is water dispersible or water-based or a latex emulsion suspension,
      (d) optionally, may be a copolymer,
      (e) optionally, may be crosslinked and
   (2) 75% to 25% by weight on a solids basis of a release promoting additive having a molecular weight of 10,000 or less, wherein the release promoting additive is
      (a) a bifunctional material, wherein such bifunctional material has
         (i) a release moiety at one end, and
         (ii) an anchoring moiety at the other end has a complementary function to the functional moiety of the functional polymer, and
      (b) is water compatible or water miscible.

2. The low adhesion backsize coating according to claim 1 wherein the functional moiety of the functional polymer is selected to promote ionic interaction, acid-base interaction, hydrogren bonding or a combination thereof with the anchoring moiety of the bifunctional material.

3. The low adhesion backsize coating according to claim 1 wherein the functional polymer and the release promoting additive provide more than one interaction per molecule of each component.

4. The low adhesion backsize coating according to claim 1 wherein the functional moiety of the functional polymer is a hydrogen bond donor, a hydrogen bond acceptor, an acidic group, a basic group, an anionic group, a cationic group or combinations thereof.

5. The low adhesion backsize coating according to claim 4 wherein the hydrogen bond donor is a carboxylic acid, an alcohol or combinations thereof.

6. The low adhesion backsize coating according to claim 4 wherein the hydrogen bond acceptor is a substituted amide, an ether or combinations thereof.

7. The low adhesion backsize coating according to claim 4 wherein the functional polymer is a (meth)acrylate, a vinyl acetate, a styrene, a polyurethane, a cellulosic, and combinations thereof.

8. The low adhesion backsize coating according to claim 7 wherein the functional polymer is a carboxylic (meth) acrylate.

9. The low adhesion backsize coating according to claim 1 wherein the anchoring moiety of the release promoting additive is a hydrogen bond donor, a hydrogen bond acceptor, an acidic group, a basic group, an anionic group, a cationic group or combinations thereof, such that the anchoring moiety is complementary to the functional moiety of the functional polymer.

10. The low adhesion backsize coating according to claim 9 wherein the hydrogen bond donor is a carboxylic acid, an alcohol or combinations thereof.

11. The low adhesion backsize coating according to claim 9 wherein the hydrogen bond acceptor is a substituted amide, an ether or combinations thereof.

12. The low adhesion backsize coating according to claim 9 wherein the release promoting additive is a nonionic surfactant, a long chain alkyl carboxylic acid and salts, a silicone copolyol, a fluorochemical surfactant, and combinations thereof.

13. The low adhesion backsize coating according to claim 1 wherein the release moiety of the release promoting additive is a long chain hydrocarbon, a fluorochemical, or a silicone.

14. The low adhesion backsize coating according to claim 13 wherein the release moiety of the release promoting additive is a poly(dimethyl siloxane) group.

15. A coated sheet comprising a layer of a low adhesion backsize coating coated onto at least one portion of one surface of a substrate, having two major surfaces wherein the low adhesion backsize coating comprises:
   (1) 25% to 75% by weight on a solids basis of a functional polymer wherein the functional polymer has
      (a) a functional moiety,
      (b) is non-tacky at room temperature, (c) is water dispersible or water-based or a latex emulsion suspension,
(d) optionally, may be a copolymer,
(e) optionally, may be crosslinked and (2) 75% to 25% by weight on a solids basis of a release promoting additive having a molecular weight of 10,000 or less, wherein the release promoting additive is
  (a) a bifunctional material, wherein such bifunctional material has
    (i) a release moiety at one end, and
    (ii) an anchoring moiety at the other end has a complementary function to the functional moiety of the functional polymer, and
  (b) is water compatible or water miscible.

16. The coated sheet according to claim 15 wherein the low adhesion backsize coating is about 0.2 to about 2.0 grams/m$^2$.

17. The coated sheet according to claim 15 wherein further comprising a normally tacky pressure-sensitive adhesive is on at least a portion of the other side of the substrate.

18. The coated sheet according to claim 17 further comprising a stack of superimposed sheets of the coated sheet wherein the pressure-sensitive adhesive coated side of the sheet is in contact with a low adhesion backsize coating side of an immediately adjacent sheet.

19. The coated sheet according to claim 18 wherein the superimposed sheets form a fan folded web formed from the coated sheet material, wherein an adhesive coating is on each segment of the web being in contact with a low adhesion backsize coating on an immediately adjacent coated sheet.

* * * * *